United States Patent [19]
Delacourt et al.

[11] Patent Number: 5,289,309
[45] Date of Patent: Feb. 22, 1994

[54] OPTICAL FREQUENCY DOUBLER USING QUANTUM WELL SEMICONDUCTOR STRUCTURES

[75] Inventors: Dominique Delacourt, Paris; Jean-Claude Pocholle, Arpajon/ la Norville; Michel Papuchon, Villebon Palaiseau, all of France

[73] Assignee: Thomson-CSF, Puteaux, France

[21] Appl. No.: 6,608

[22] Filed: Jan. 21, 1993

[30] Foreign Application Priority Data

Jan. 21, 1992 [FR] France ............................ 92 00583

[51] Int. Cl.$^5$ .................................... G02F 1/37
[52] U.S. Cl. ...................... 359/328; 257/21; 359/326
[58] Field of Search ............ 385/122; 359/326–332; 257/14, 15, 21, 22

[56] References Cited

U.S. PATENT DOCUMENTS

| | | | |
|---|---|---|---|
| 4,528,464 | 7/1985 | Chemla et al. | 359/326 |
| 4,822,992 | 4/1989 | Bar-Joseph et al. | 257/15 |
| 4,896,931 | 1/1990 | Khurgin | 359/328 X |
| 5,005,933 | 4/1991 | Shimuzu | 385/122 X |

FOREIGN PATENT DOCUMENTS

90006596 6/1990 World Int. Prop. O. .

OTHER PUBLICATIONS

Physical Concepts of Materials for Novel Optoelectronic Device Applications, SPIE vol. 1361, Oct./Nov. 1990, pp. 262–273, J. S. Harris, Jr., et al., "Quantum Wells and Artificially Structured . . . ".
Nonlinear Optics 1990 Digest, Paper TP13, Jul. 1990, pp. 113–114, A. SA AR, et al., "Infrared Second Harmonic Generation by Intersubband Transitions in . . . ".
IEEE Journal of Quantum Electronics, vol. 25, No. 1, Jan. 1989, pp. 54–60, Z. Ikonic, et al., "Resonant Second Harmonic Generation by . . . ".
Physical Review Letters, vol. 62, No. 9, pp. 1041–1044, M. M. Fejer, et al., Feb. 1989, "Observation of Extremely Large Quadratic Susceptibility . . . ".

*Primary Examiner*—John D. Lee
*Attorney, Agent, or Firm*—Oblon, Spivak, McClelland, Maier & Neustadt

[57] ABSTRACT

Disclosed is a frequency doubler having a quantum well semiconductor structure and a second-order non-linear susceptibility grating that can be used to amplify notably the frequency doubling. The grating can be recorded optically or electrically within the semiconductor structure and has a pitch in the plane of the structure. Such a frequency doubler finds particular application to optical recording or reading systems.

12 Claims, 5 Drawing Sheets

OPTICAL FREQUENCY DOUBLER USING QUANTUM WELL SEMICONDUCTOR STRUCTURES

BACKGROUND OF THE INVENTION

1. Field of the Invention

The invention relates to an electromagnetic frequency doubler comprising a quantum well semiconductor structure capable of amplifying non-linear optical effects and notably capable of amplifying second-harmonic generation.

2. Discussion of the Background

Frequency doublers can advantageously be used in optical recording and reading systems or any other field in which it is sought to have a power source available at a determined wavelength that cannot be generated by the standard materials used. However, the major problem of frequency doublers lies in the phase-matching that must imperatively be set up between the polarization created by the incident electromagnetic wave and the created harmonic wave. Indeed, the created harmonic wave gets propagated in a material with a wave vector $k_{2\omega}$ such that:

$$k_{2\omega} 2\pi \eta_{2\omega}/\eta_{2\omega} = 2 \times 2\pi \eta_{2\omega}/\lambda_\omega$$

where $\eta_{2\omega}$ is the refraction index of the material at the frequency $2\omega$, if $\omega$ is the frequency of the incident electromagnetic wave that gets propagated with a vector $k_{107}$ such that:

$$k_{107} = 2\pi \eta_\omega/\eta_\omega$$

$\eta_\omega$ being the refraction index of the material at the frequency $\omega$.

Generally, $\eta_\omega$ is different from $\eta_{2\omega}$ and the phase-shift existing between the polarization created by the incident electromagnetic wave and that created by the harmonic wave drastically restricts any efficiency of conversion of the frequency $\omega$ into $2\omega$. The term coherence length Lc designates the length of material at the end of which this phase-shift reaches $\pi$, Lc being therefore defined as follows:

$$Lc(k_{2\omega} - 2k_\omega) = \pi$$

or again:

$$Lc = \eta_{107}/4(\lambda_{2\omega} - \lambda_\omega).$$

Figure 1:
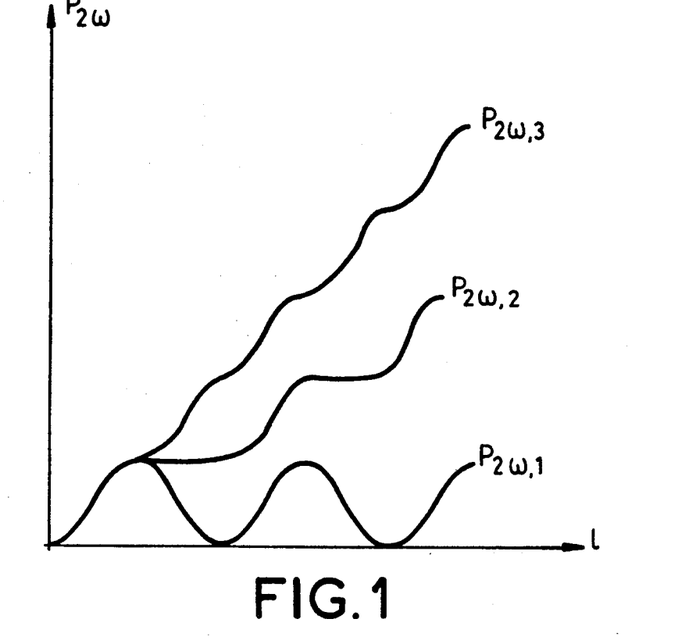
FIG. 1 illustrates the behavior of the power created at the frequency 2ω under the action of an electromagnetic wave as a function of the path travelled within the frequency doubler structure:
* the curve $P_{2\omega,1}$ represents the development of the power 2ω of a structure without grating;
* the curve $P_{2\omega,2}$ represents the development of the power 2ω of a structure comprising $+\chi^{(2)}$ domains separated periodically by domains where the second-order susceptibility is zero;
* the curve $P_{2\omega,3}$ represents the development of the power 2ω of a structure comprising $+\chi^{(2)}$ domains separated periodically by $-\chi^{(2)}$ domains.

A known approach by which this problem can be overcome consists in using a periodic disturbance with a pitch—so as to form, for example, an index grating or a second-order non-linear susceptibility grating referenced $\chi^{(2)}$ responsible for the second-harmonic generation. By making an intelligent choice of $\Lambda$ such that Lc = $\Lambda/2$ it is possible to add up the power emitted at the frequency $2\omega$ on the path travelled by the incident electromagnetic wave, as illustrated in FIG. 1 representing the progress of the power created at the frequency $2\omega$, as a function of the length 1 travelled in the middle of the doubler. Without grating, we obtain the curve $P_{2\omega,1}$ as a function of 1. By using a grating structure in which there are periodically created domains wherein the coefficient $\chi(2)$ is not zero, separated from domains in which the coefficient $\chi^{(2)}$ is zero, the curve $P_{2\omega,2}$ is obtained. Finally, by creating a grating of domains separated from $-\chi^{(2)}$ domains, the curve $P_{2\omega,3}$ with the best performance is obtained.

SUMMARY OF THE INVENTION

To obtain high efficiency inside a frequency doubler, the invention proposes to use a quantum well semiconductor structure, for which it is known that a structure such as this enables the non-linear effects to be greatly amplified and enables the recording, in this structure, of a second-order non-linear susceptibility grating, in order to fulfill the condition of quasi-phase-matching, said grating being controllable optically or electrically. More specifically, the invention proposes an electromagnetic wave frequency doubler, having a wavelength $\lambda_\omega$, with a semiconductor structure comprising a stack of layers constituted by semiconductor materials enabling the creation of potential wells, wherein there are at least two discrete energy levels $e_1$ and $e_2$ in the wells such that $e_1$ is smaller than $e_2$, the density of probability of the presence of electrons on $e_2$ is an asymmetrical function and said doubler comprises a second-order non-linear susceptibility grating resulting from the populating, with electrons, of the level $e_1$ and from this asymmetry, the pitch of the grating being in the plane of the layers, said grating being optically controllable by an optical beam with a wavelength $\lambda p$ that locally and periodically irradiates the semiconductor structure so as to locally populate the energy level $e_1$ with electrons and said grating making it possible to carry out the phase matching between the polarization created by an incident electromagnetic wave and a created harmonic wave, the two waves getting propagated in the plane of the semiconductor structure.

The frequency doubler according to the invention can advantageously be obtained from at least one set of materials $M_I$, $M_{II}$, $M_{III}$ and $M_{IV}$ so as to define asymmetrical quantum wells having two different central gap widths., the wells having at least two discrete energy levels $e_1$ and $e_2$. The electron level $e_1$ can be populated optically under the effect of an optical beam with a wavelength $\lambda p$ such that $hc/\lambda p$ is greater than $(e_1 - h_1)$; h being the Planck's constant and c the velocity of light. By using two light beams that emit at $\lambda p$ and that form angles $\theta$ on each side of the normal to the plane of the layers, it is thus possible to define interference fringes that are locally capable of irradiating or not irradiating the semiconductor structure so as to locally and periodically populate the energy level $e_1$. Under the incidence of an electromagnetic wave with a wavelength $\lambda_\omega$, second-harmonic generation is thus created in the regions where the level $e_1$ is populated; a definition is then made, optically, of a second-order non-linear susceptibility grating, the pitch of which is adjustable as a function of the angle $2\theta$ between the incident beams at the wavelength $\lambda p$.

In a doubler according to the invention, it is also possible to use a semiconductor structure comprising at least one set of layers of material $M'_1$, $M'_{II}$, $M_{III}$ and $M_{IV}$ so as to define quantum wells having three central gap widths $E'_{gII}$, $E'_{gIII}$ and $E'_{gIV}$, with $E'_{gII}$ and $E'_{gIV}$ being equal and being greater than $E'_{gIII}$ and the quantum wells being made asymmetrical by the application of an electrical field that is perpendicular to the plane of the layers.

BRIEF DESCRIPTION OF THE DRAWINGS

The present invention will be understood more clearly and other advantages will appear from the following description and from the appended figures, of which:

FIG. 4 illustrates an asymmetrical quantum well.

FIG. 7 illustrates an exemplary symmetrical quantum well that can be made in a semiconductor structure used in a frequency doubler according to the invention.

MORE DETAILED DESCRIPTION

Figure 2:
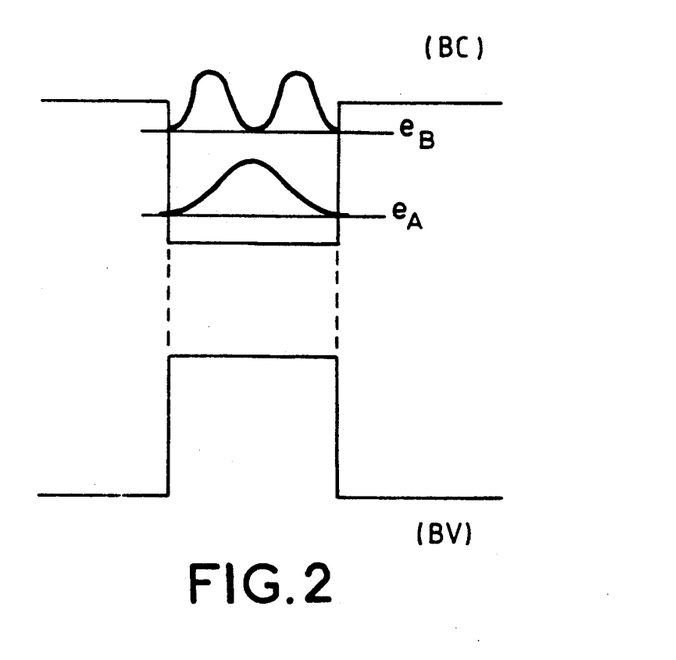
FIG. 2 shows a schematic view of a quantum well with two energy levels in which there are shown the densities of probability of the presence of electrons.
Figure 3:
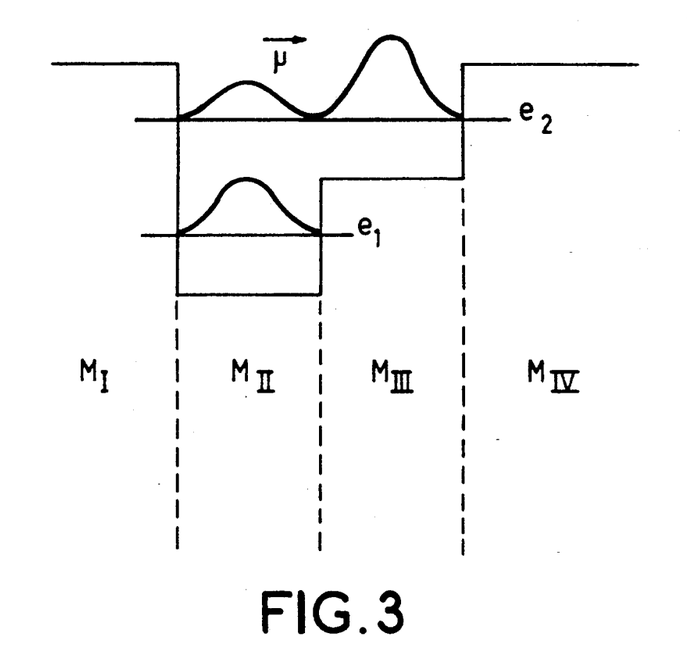
FIG. 3 illustrates an example of an asymmetrical well with the densities of probability of the presence of electrons on the energy levels within the well, capable of being made in a semiconductor structure used in a frequency doubler according to the invention.

Generally, the association of at least three layers of semiconductor materials having different gap widths enables the creation of a potential well for the electrons in the conduction band and for the holes in the valence band. When the dimensions of this well are close to the de Broglie wavelengths associated with these particles, the total energy permitted to them can take only a finite number of discrete values. This number of values and these values are directly a function of the dimensions of the quantum wells and of the characteristics of the semiconductor materials. In the case of a quantum well obtained by the association of three materials such that this well has two discrete energy levels $e_A$ and $e_B$ illustrated by FIG. 2, it is possible, under the effect of an electromagnetic wave, to generate a transition from the level $e_A$ to the level $e_B$, the densities of probability of the presence of electrons on the levels $e_A$ and $e_B$ are represented in this figure as are the conduction band (BC) and the valence band (BV) of this structure. To this end, the wavelength $\lambda_\omega$ of the electromagnetic wave should be such that $(e_B - e_A)$ is close to $hc/\lambda_\omega$. In the case of a structure having a symmetrical quantum well such as the one shown in FIG. 2, the density of probability of the presence of electrons on the upper level is a symmetrical curve that has no dipole and hence no second-order non-linear susceptibility. In the case of an asymmetrical quantum well structure such as the one shown in FIG. 3, obtained from four materials M, $M_{II}$, $M_{III}$ and $M_{IV}$, the density of probability of the presence of electrons on the energy level $e_2$ is asymmetrical and contributes to the creation of dipoles μ responsible for the second-order non-linear susceptibility which is then appreciably increased with respect to the one created within the materials $M_I$, $M_{II}$, $M_{III}$ and $M_{IV}$ when they are in their "massive" form, i.e. in a configuration that does not enable the observation of the quantum phenomena referred to herein.

This resonance of the second-order non-linear susceptibility may be put to profitable use especially in the field of second-harmonic generation.

To this end, preferably, a semiconductor structure is prepared having three discrete energy levels $e_1$, $e_2$ and $e_3$ in the conduction band and three discrete energy levels $h_1$, $h_e$ and $h_3$ in the valence band, such that:

$e_1 - h_1$ is between $Eg_{II}$ and $Eg_{III}$
$e_2 - h_2$ is between $Eg_{III}$ and $Eg_{IV}$
$e_3 - h_3$ is between $Eg_{III}$ and $Eg_{IV}$ and such that $(e_3-h_3) - (e_2-h_2)$ differs little from $(e_2-h_2) - (e_1-h_1)$, $Eg_{II}$, $Eg_{III}$ and $Eg_{IV}$ being the three gap widths of the well. A configuration such as this is particularly favorable to the emission of a wave at the frequency 2ω under the effect of an electromagnetic wave at the frequency ω.

Figure 4A:
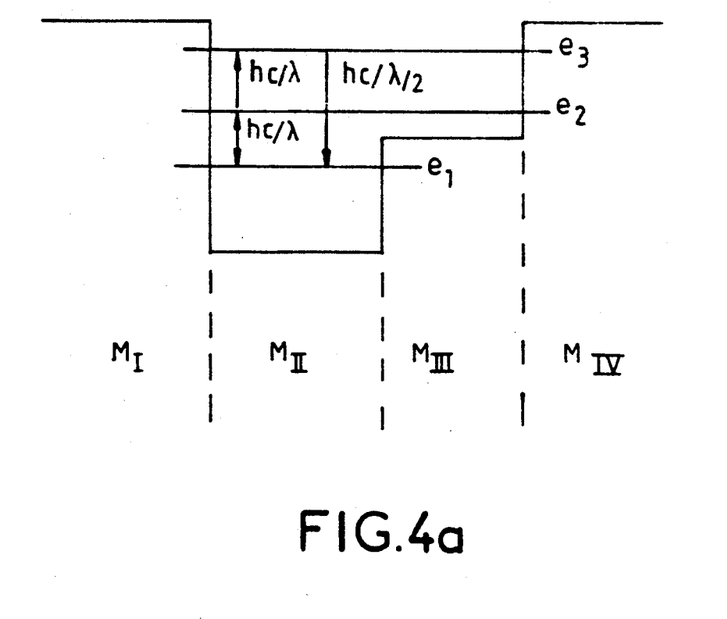
* FIG. 4a shows a three-level well with the possible transitions.
Figure 4B:
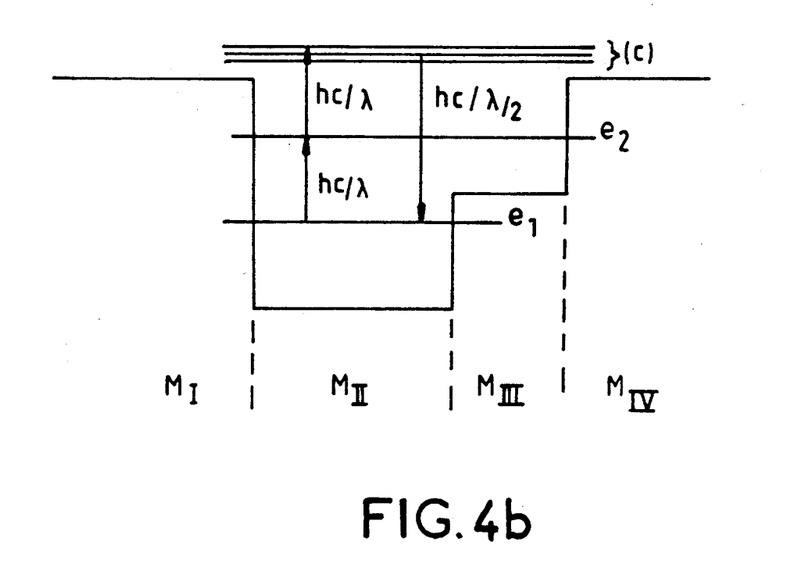
* FIG. 4b shows a two-level well with the possible transitions.

FIG. 4a illustrates the transitions permitted with a semiconductor structure having three discrete energy levels. FIG. 4b shows that the same transitions are possible with a two-level structure and the discrete level $e_3$ is then replaced by a continuum of states (C) in the conduction band having the configuration that is least favorable to second-harmonic generation.

Figure 5:
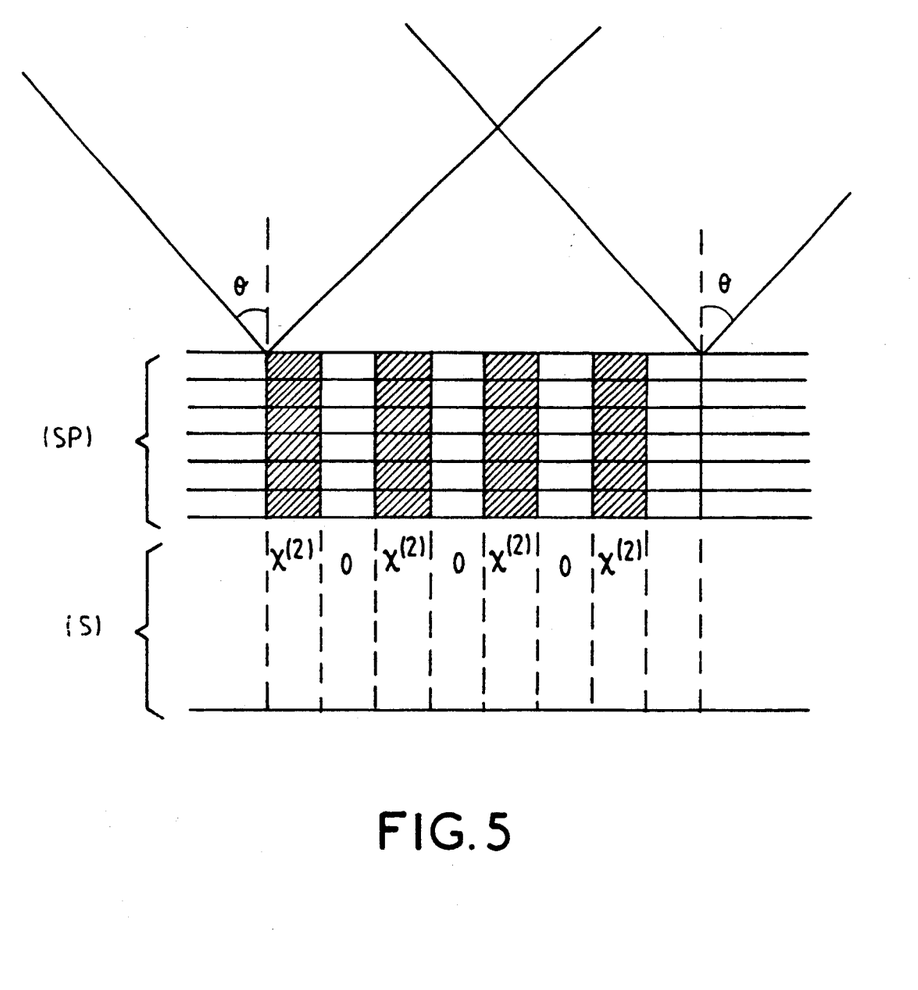
FIG. 5 illustrates an exemplary frequency doubler according to the invention using an optical control of a second-order non-linear susceptibility grating made within an asymmetrical quantum well semiconductor structure.

The frequency doubler according to the invention advantageously uses this type of semiconductor structure leading to an increase in the value $\chi^{(2)}$ of the second-order non-linear susceptibility, which is spatially modulated to obtain the phase matching. To create the second-harmonic generation, it is necessary for the inter-sub-band transitions (between $e_1$ and $e_2$) to actually occur and hence for the fundamental level $e_1$ to be populated with electrons. If this level $e_1$ is not populated, no transition occurs and the value $\chi^{(2)}$ remains the one taken in the materials when they are in their "massive" form, i.e. this value is far lower (with a difference of about three magnitudes). In a frequency doubler according to the invention, it is proposed to optically control the populating of the conduction band with electrons and of the valence band with holes, by setting up illumination with a wave having photon energy that is sufficient to prompt inter-band transitions, i.e. transitions between the valence band and the conduction band. To make the grating that enables phase-matching between electromagnetic waves and harmonic waves, preferably an optical command is used. This command is obtained by the interference of two optical beams forming angles θ on each side of the normal to the plane of the layers in such a way as to periodically define zones in which the level $e_1$ is populated and zones in which the level $e_1$ is not populated. Thus, the second-order non-linear susceptibility grating is constituted inside the semiconductor structure (SP) deposited on a substrate S, described in FIG. 5, which uses the juxtaposition of several asymmetrical wells to further increase the frequency conversion. The regions in which the optical beams have destructive interferences have values of $\chi^{(2)}$ that are very small as compared with those of neighboring regions and are represented schematically in FIG. 4 by values of $\chi^{(2)}$ close to zero. This type of optical command is especially promising inasmuch as the control of the angle $\theta$ enables the adjusting of the pitch of the grating to the wavelength $\lambda_\omega$ of the electromagnetic wave for which it is sought to double the frequency. There is thus a frequency doubler available, comprising a second-order non-linear susceptibility grating that can be reconfigured by optical command.

For example, the semiconductor structure used in a frequency doubler according to the invention may be designed around GaAs/GaAlAs materials. More specifically, the materials $M_I$, $M_{II}$, $M_{III}$ and $M_{IV}$ may be the following:

$M_I$: $Ga_{0.6}Al_{0.4}As$ $M_{II}$: GaAs $M_{III}$: $Ga_{0.9}Al_{0.1}As$ $M_{IV}$: $Ga_{0.6}Al_{0.4}As$ the thickness of the layer of material $M_{II}$ being 59.4 angstroms and the thickness of the layer of material $M_{III}$ being 42.4 angstroms.

Figure 6:
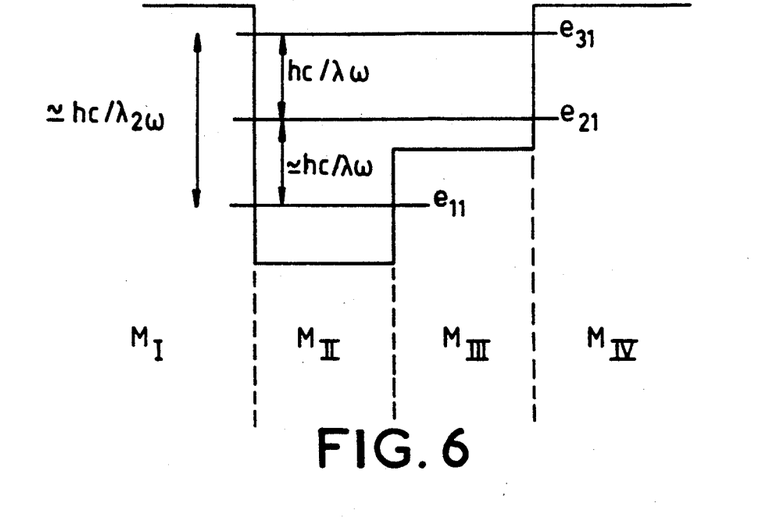
FIG. 6 illustrates an exemplary semiconductor structure used in a frequency doubler according to the invention, designed around GaAs/GaAlAs materials.

In a structure such as this, there are three discrete energy levels $e_{11}$, $e_{21}$ and $e_{31}$ in the conduction well. This exemplary structure is shown in FIG. 6.

The asymmetrical quantum well of the structure is such that the level $e_{11}$ is not previously populated in order to achieve efficient control, optically, over the populating of the level $e_{11}$. Typically, the energy differences are as follows:

$$e_{21} - e_{11} = 118.8 \text{ meV}$$

$$e_{31} - e_{21} = 114.7 \text{ meV}$$

Thus, a structure such as this is especially well suited to the frequency doubling of an electromagnetic wave with a wavelength $\pi\omega = 10.6$ μm. Indeed, in this case, $hc/\lambda\omega$ is of the order of 117 meV. With an optical pumping enabling a concentrate of carriers of $10^{17}$ electrons/cm$^3$, there is obtained a value $\chi_{(2)}$ of second-order susceptibility close to $2 \cdot 10^5$ pm/V (it may be noted that, in GaAs in its "massive" form, the value of $\chi^{(2)}$ is of the order of $4.10 \cdot 10^2$ pm/V). To achieve the quasi-phase-matching condition, it is sought to obtain a periodic illumination, the interfringe of which is equal to two coherence lengths. The angle $\theta$ made by the two beams with the normal to the plane of the layers should then verify the condition $\sin\theta = \lambda_p/4 \text{ Lc}$ if $\lambda_p$ is the wavelength of these two beams. With the materials used for the semiconductor structure chosen, $\lambda_p$ is close to 0.84 μm. Since the coherence length is of the order of 100 μm, an angle $\theta$ equal to 0.12° is thus obtained.

Figure 7A:
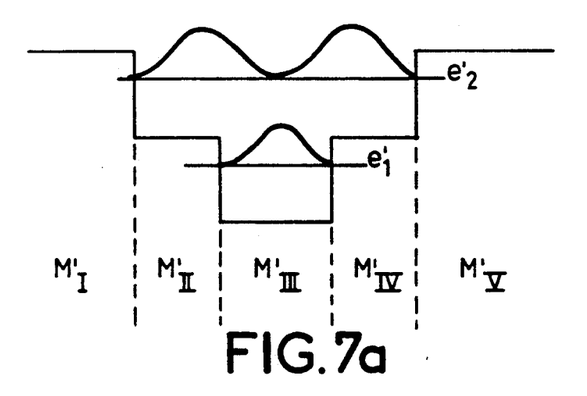
* FIG. 7a shows the density of probability of the presence electrons of the energy levels within the well when there is no electrical field.
Figure 7B:
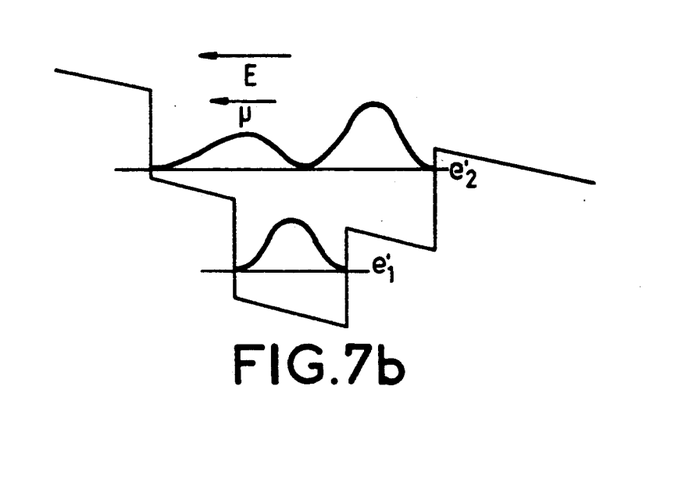
* FIG. 7b shows the density of probability of the presence of electrons on the energy levels within the well when there is an electrical field.

The frequency doublers described advantageously use an asymmetrical quantum well semiconductor structure. The invention also proposes to carry out the frequency doubling in a symmetrical well. Indeed, a symmetrical well configuration may be modified into an asymmetrical well configuration under the effect of an electrical field. FIG. 7 illustrates an example of an asymmetrical well using five different materials $M'_I$, $M'_{II}$, $M'_{III}$, $M'_{IV}$ and $M'_V$. In FIG. 7a, the of probability of the presence of electrons are shown on two discrete energy levels $e'_1$ and $e'_2$. On the upper level $e'_2$, the density is a symmetrical curve. In the presence of an electrical field E, it is possible to deform the shape of the symmetrical well and create an asymmetry at the level of the density of probability of the presence of electrons on the level $e'_2$ and thus generate a dipole responsible for the second-harmonic generation. Depending on the direction of the field, it is thus possible to create second-order non-linear susceptibility zones with a value of $+\chi^{(2)}$ and second-order non-linear susceptibility zones with a value of $-\chi^{(2)}$.

What is claimed is:

1. An electromagnetic wave frequency doubler, the electromagnetic wave having a wavelength λw, with a semiconductor structure comprising a stack of layers constituted by semiconductor materials enabling the creation of potential wells, wherein there are at least two discrete energy levels $e_1$ and $e_2$ in the wells such that $e_1$ is smaller than $e_2$, the density of probability of the presence of electrons on $e_2$ is an asymmetrical function and said doubler comprises a second-order non-linear susceptibility grating resulting from the populating, with electrons, of the level $e_1$ and from this asymmetry, the pitch of the grating being in the plane of the layers, said grating being optically controllable by an optical beam with a wavelength λp that locally and periodically irradiates the semiconductor structure so as to locally populate the energy level $e_1$ with electrons and said grating making it possible to carry out the phase matching between the polarization created by an incident electromagnetic wave and a created harmonic wave, the two waves getting propagated in the plane of the stack of layers.

2. A frequency doubler according to claim 1, wherein the semiconductor structure comprises at least one set of materials $M_I$, $M_{II}$, $M_{III}$ and $M_{IV}$ so as to define asymmetrical quantum wells having two different central gap widths, the wells having at least two discrete energy levels $e_1$ and $e_2$.

3. A frequency doubler according to either of the claims 1 or 2, wherein two optical beams forming angles $\theta$ on each side of the normal to the plane of the layers irradiate the entire structure and define interference fringes capable of periodically forming regions of second-order non-linear susceptibility $\chi^{(2)}$ separated by regions of second-order non-linear susceptibility with values far smaller than $\chi^{(2)}$.

4. A frequency doubler according to either of claims 1 or 2, where λp is close to 0.8 μm.

5. A frequency doubler according to either of claims 1 or 2, where λw is close to 10 μm.

6. A frequency doubler according to claim 1, wherein the semiconductor structure includes at least one set of layers of materials $M'_I$, $M'_{II}$, $M'_{III}$ and $M'_{IV}$ so as to define quantum wells having three central gap widths $E'_{gII}$, $E'_{gIII}$ and $E'_{gIV}$, with $E'_{gIII}$ and the quantum wells being made asymmetrical by the application of an electrical field that is perpendicular to the plane of the layers.

7. An electromagnetic wave frequency doubler, the electromagnetic wave having a wavelength λw, comprising:

a stack of layers formed of semiconductor materials for forming potential wells, wherein there is at least two discrete energy levels $e_1$ and $e_2$ in the potential wells such that $e_1$ is smaller than $e_2$, and a density of probability of a presence of electrons on $e_2$ is an asymmetrical function;

a second-order non-linear susceptibility grating resulting from populating, with electrons, of the level $e_1$ and from the asymmetrical function, a pitch of the grating being in a plane of the stack of layers, said grating being optically controllable by an optical beam with a wavelength $\lambda p$ that locally and periodically irradiates the stack of layers so as to locally populate the energy level $e_1$ with electrons and said grating providing phase matching between a polarization created by an incident electromagnetic wave and a created harmonic wave, these two waves being propagated in the plane of the stack of layers.

8. The frequency doubler according to claim 7, wherein the stack of layers comprises at least one set of materials, $M_I$, $M_{II}$, $M_{III}$ and $M_{IV}$ so as to define asymmetrical quantum potential wells having two different central gap widths, the potential wells having at least two discrete energy levels $e_1$ and $e_2$.

9. The frequency doubler according to either of claims 7 or 8, wherein two optical beams forming angles $\theta$ on each side of a normal to the plane of the stack of layers irradiate the stack of layers and define interference fringes capable of periodically forming regions of second-order non-linear susceptibility $\chi(2)$ separated by regions of second-order non-linear susceptibility with values smaller than $\chi(2)$.

10. The frequency doubler according to either of claims 7 or 8, wherein $\lambda p$ equals 0.8 $\mu$m.

11. The frequency doubler according to either of claims 7 or 8, wherein $\lambda w$ equals 10 $\mu$m.

12. The frequency doubler according to claim 7, wherein the stack of layers includes at least one set of layers of materials $M'_I$, $M'_{II}$, $M'_{III}$ and $M'_{IV}$ so as to define quantum potential wells having three central gap widths, $E'_{g_{II}}$, $E'_{g_{III}}$ and $E'_{g_{IV}}$, with $E'_{g_{II}}$ and $E'_{g_{IV}}$ being equal and being greater than $E'_{g_{III}}$ and the quantum potential wells being made asymmetrical by an application of an electrical field that is perpendicular to the plane of the stack of layers.

* * * * *

UNITED STATES PATENT AND TRADEMARK OFFICE
CERTIFICATE OF CORRECTION

PATENT NO. : 5,289,309
DATED : February 22, 1994
INVENTOR(S) : Dominique DELACOURT, et al.

It is certified that error appears in the above-indentified patent and that said Letters Patent is hereby corrected as shown below:

On the title page, Item [75], the 2nd inventor's name should read as follows:

--Jean-Paul Pocholle--

Signed and Sealed this

Twenty-eighth Day of June, 1994

Attest:

BRUCE LEHMAN

*Attesting Officer*     *Commissioner of Patents and Trademarks*